United States Patent
Li et al.

(10) Patent No.: US 11,816,368 B2
(45) Date of Patent: Nov. 14, 2023

(54) CLOUD PRINTING METHOD AND CLOUD PRINTING SYSTEM

(71) Applicant: Zhuhai Pantum Electronics Co., Ltd., Zhuhai (CN)

(72) Inventors: Jiade Li, Zhuhai (CN); Yuanzhu Xi, Zhuhai (CN); Xinping Li, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 17/975,498

(22) Filed: Oct. 27, 2022

(65) Prior Publication Data

US 2023/0140752 A1    May 4, 2023

(30) Foreign Application Priority Data

Oct. 28, 2021  (CN) .......................... 202111263000.7

(51) Int. Cl.
  *G06F 3/12*   (2006.01)
  *H04L 67/51*  (2022.01)
  *H04N 1/00*   (2006.01)

(52) U.S. Cl.
  CPC .......... *G06F 3/1206* (2013.01); *G06F 3/1231* (2013.01); *G06F 3/1248* (2013.01); *H04L 67/51* (2022.05); *H04N 1/00244* (2013.01); *G06F 3/1288* (2013.01); *G06F 3/1292* (2013.01)

(58) Field of Classification Search
  None
  See application file for complete search history.

(56) References Cited

U.S. PATENT DOCUMENTS

| | | | |
|---|---|---|---|
| 2018/0081607 A1 | 3/2018 | Okumura et al. | |
| 2018/0335990 A1* | 11/2018 | Nishikawa | H04L 63/102 |
| 2020/0073606 A1* | 3/2020 | Park | G06F 3/1238 |
| 2020/0142656 A1* | 5/2020 | Seo | G06F 3/1288 |

FOREIGN PATENT DOCUMENTS

JP       2021164033 A      10/2021

OTHER PUBLICATIONS

Anonymous: MQTT (Message Queuing Telemetry Transport) protocol—wikipedia, Mar. 21, 2019 URL:https://en.wikipedia.org/w/index.php?title=MQTT&oldid=888839246.

\* cited by examiner

*Primary Examiner* — Lennin R Rodriguezgonzalez
(74) *Attorney, Agent, or Firm* — ANOVA LAW GROUP PLLC

(57) ABSTRACT

A cloud printing method includes in response to a click on a file in an application program of a client terminal to execute printing, receiving, by a cloud server, a print request sent by the client terminal, generating, by the cloud server, a print job and a uniform resource locator (URL) of the print job based on the print request, and starting, by the cloud server, a print microservice and publishing a print task to a message queuing telemetry transport (MQTT) microservice according to the print job. After a printer is connected to the cloud server, the printer is configured to send a print subscription request to the cloud server. The MQTT microservice is configured to send the print task with the URL of the print job to the printer. The printer is further configured to download the print job from the cloud server based on the URL of the print job and print the print job.

20 Claims, 6 Drawing Sheets

---

S301: In response to a click on a file in an application program of a client terminal to execute printing, the client terminal sends a print request to a cloud server, the cloud server generates a print job and URL of the print job based on the print request S302: Start a print microservice, publish a print task to a MQTT microservice according to the print job S303: After a printer is connected to the cloud server, the printer starts a print subscription request to the cloud server, the MQTT microservice sends the print task with the URL of the print job to the printer S304: The printer downloads the print job from the cloud server based on the URL of the print job and prints the print job

CLOUD PRINTING METHOD AND CLOUD PRINTING SYSTEM

CROSS-REFERENCE TO RELATED APPLICATION

This application claims priority to Chinese Patent Application No. 202111263000.7, filed Oct. 28, 2021, the entire content of which is incorporated herein by reference.

TECHNICAL FIELD

The present disclosure relates to the field of printing method and, in particular, to a method and a system for a cloud server to process printing data.

BACKGROUND

As shown in FIG. 1, a cloud server architecture adopts a monolithic architecture, which means that all functions are connected in series and packaged into a container. However, there are problems such as high complexity, strong coupling of functions, chaotic architecture, limited scalability, and hindering technological innovation. An existing cloud printing process requires a printer to online communicate with a cloud server in real time to realize a conversion processing and a print output of a file.

SUMMARY

In accordance with the disclosure, there is provided a cloud printing method including in response to a click on a file in an application program of a client terminal to execute printing, receiving, by a cloud server, a print request sent by the client terminal, generating, by the cloud server, a print job and a uniform resource locator (URL) of the print job based on the print request, and starting, by the cloud server, a print microservice and publishing a print task to a message queuing telemetry transport (MQTT) microservice according to the print job. After a printer is connected to the cloud server, the printer is configured to send a print subscription request to the cloud server. The MQTT microservice is configured to send the print task with the URL of the print job to the printer. The printer is further configured to download the print job from the cloud server based on the URL of the print job and print the print job.

Also in accordance with the disclosure, there is provided a cloud printing system including a client terminal, a cloud server, and a printer. In response to a click on a file in an application program of the client terminal to execute printing, the client terminal is configured to send a print request to the cloud server. The cloud server is configured to receive the print request and generate a print job and a uniform resource locator (URL) of the print job based on the print request. The cloud server is further configured to start a print microservice and publish a print task to a message queuing telemetry transport (MQTT) microservice according to the print job. After the printer is connected to the cloud server, the printer is configured to send a print subscription request to the cloud server. The MQTT microservice is configured to send the print task with the URL of the print job to the printer. The printer is further configured to download the print job from the cloud server based on the URL of the print job and print the print job.

Also in accordance with the disclosure, there is provided a non-transitory computer-readable storage medium storing computer instructions, when the computer instructions being executed, performing a cloud printing method include in response to a click on a file in an application program of a client terminal to execute printing, receiving, by a cloud server, a print request sent by the client terminal, generating, by the cloud server, a print job and a uniform resource locator (URL) of the print job based on the print request, and starting, by the cloud server, a print microservice and publishing a print task to a message queuing telemetry transport (MQTT) microservice according to the print job. After a printer is connected to the cloud server, the printer is configured to send a print subscription request to the cloud server. The MQTT microservice is configured to send the print task with the URL of the print job to the printer. The printer is further configured to download the print job from the cloud server based on the URL of the print job and print the print job.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

An image forming apparatus consistent with the embodiments of the present disclosure includes a device having at least one function related to image forming. The function related to image forming may include but is not limited to a printing function, a scanning function, a copying function, and a facsimile function. The image forming apparatus may include, for example, a single-function printer, a multi-function printer, or a digital composite machine. The single-function printer may include an image forming apparatus with a printing function only. The multi-function printer may include an image forming apparatus with printing, copying, scanning and/or fax functions, and a function for optionally setting a number of paper trays. The digital composite machine may include an apparatus based on the copy function, with standard or optional printing, scanning, and faxing functions. The digital composite machine may use digital principles to output files in a form of laser printing. The digital composite machine may edit images and texts as needed, and may have a large capacity paper tray, a large memory, a large hard disk, a powerful network support, and a multitasking parallel processing capability.

Figure 1:
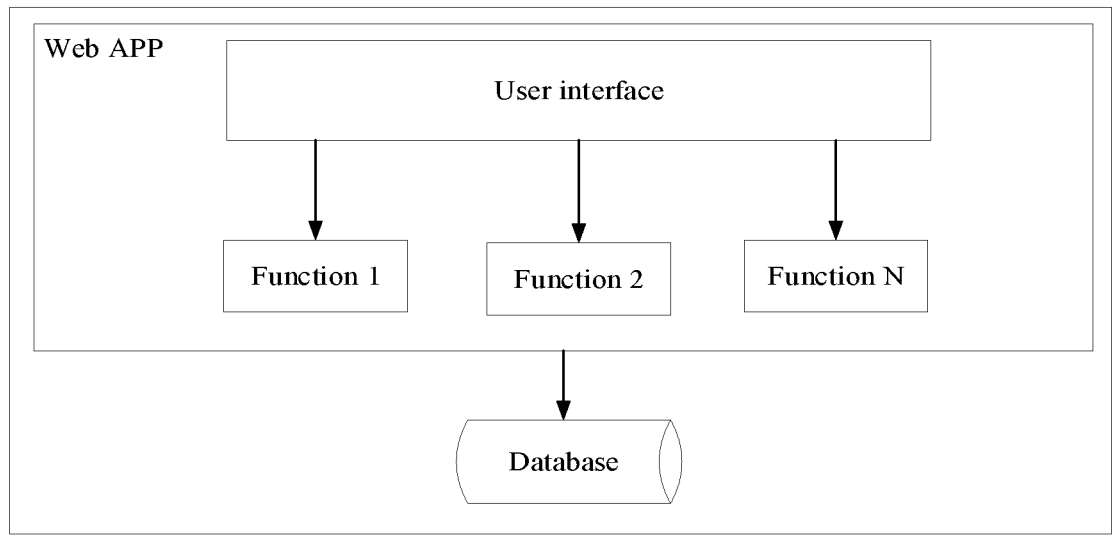
FIG. 1 is an architecture example diagram of a cloud server according to an existing technology.
Figure 2:
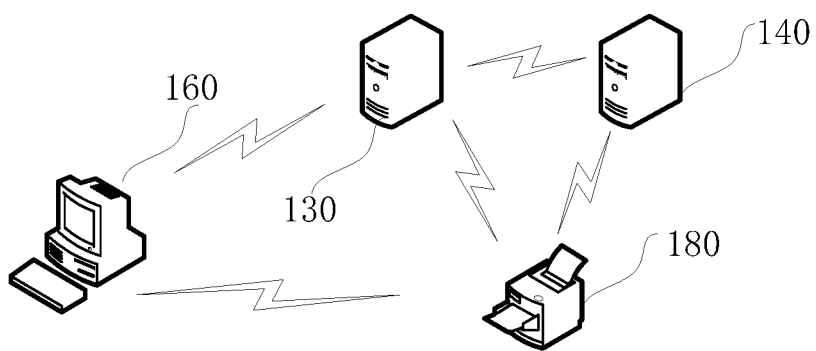
FIG. 2 is a schematic diagram of a cloud printing system consistent with the embodiments of the disclosure.

FIG. 2 is a schematic diagram of a cloud printing system consistent with the embodiments of the disclosure. As shown in FIG. 2, the cloud printing system includes a first control terminal 160 and an image forming apparatus 180. The first control terminal 160 is communicated connected to the image forming apparatus 180. The image forming apparatus 180 may include but are not limited to a single-function printer, a multi-function printer, or a digital composite machine. In an example embodiment, the cloud printing system also includes a first server 130 and a print manufacturer server 140.

The first control terminal 160 may include an electronic device with a print driver installed, such as a computer, or an electronic device that can communicate with the printer, such as a mobile phone or a mobile tablet. The first control terminal 160 may be referred to as a client, a client terminal, or a host.

In some embodiments, the first control terminal 160 may be connected to the image forming apparatus 180 through a local area network. The image forming apparatus 180 may be connected to the first control terminal 160 through a USB cable. The image forming apparatus 180 may be connected to the first control terminal 160 by a wireless manner, for example, Bluetooth or Wi-Fi. In some embodiments, the first control terminal 160 is communicated connected with the first server 130. The first server 130 is communicated connected with the image forming apparatus 180. The first control terminal 160 may exchange information with the image forming apparatus 180 through the first server 130. The first control terminal 160 may communicate with the first server 130. The print manufacturer server 140 may communicate with the first server 130. The print manufacturer server 140 may communicate with the image forming apparatus 180. The print manufacturer server 140 may register and manage the image forming apparatus 180 connected to the Internet. The first control terminal 160 may exchange information with the image forming apparatus 180 through the first server 130 and the print manufacturer server 140. The connection manner between the first control terminal 160 and the image forming apparatus 180 is not limited here.

In some embodiments, a driver program of the first control terminal 160 may send a print job to the image forming apparatus 180 to perform printing. The first control terminal 160 may add an image forming apparatus through an application program, to realize a function such as quick printing. The application program may include DingTalk or QQ. The first server 130 may include a DingTalk server or a QQ server. The cloud server may include the first server 130 or the print manufacturer server 140.

Figure 3:
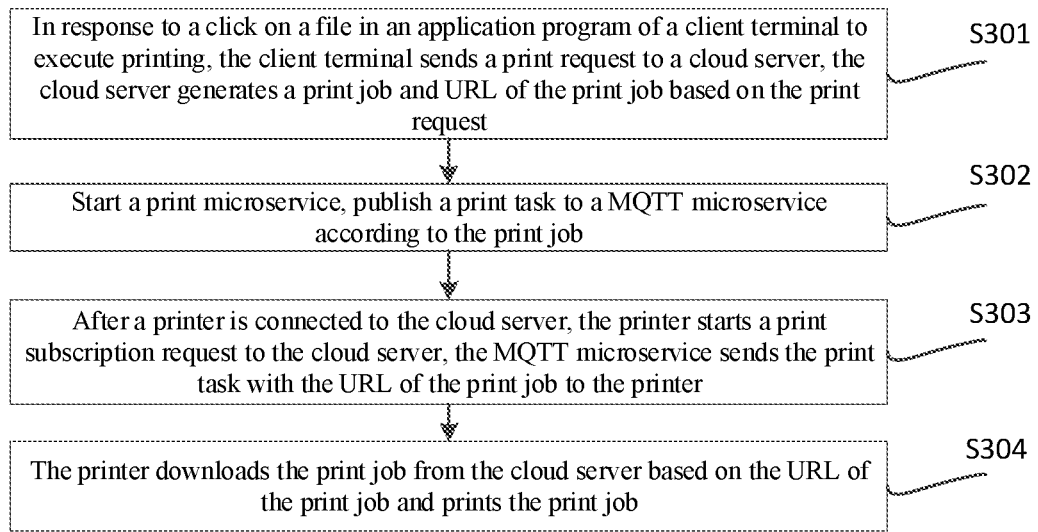
FIG. 3 is a schematic flow chart of the cloud printing method consistent with the embodiments of the disclosure.

FIG. 3 is a schematic flow chart of the cloud printing method consistent with the embodiments of the disclosure. As shown in FIG. 3, the cloud printing method includes the following processes.

At S301, in response to clicking a file in an application program of a client terminal to execute printing, the client terminal sends a print request to a cloud server. The cloud server generates a print job and a uniform resource locator (URL) of the print job based on the print request.

At S302, the cloud server starts a print microservice, and publishes a print task to a message queuing telemetry transport MQTT microservice.

At S303, after a printer is connected to the cloud server, the printer sends a print subscription request to the cloud server. The MQTT microservice sends the print task with the URL of the print job to the printer.

At S304, the printer downloads the print job from the cloud server based on the URL of the print job and prints the print job.

The print microservice and the MQTT microservice are set up to realize offline printing of cloud printing. A user does not need to identify whether a target printer is online or not. In response to the application program being bounded to the printer, after the user selects a file to print, the cloud server publishes the print task through the MQTT microservice. After the printer is connected to the cloud server, the printer prints the file.

In some embodiments, the cloud server generates the print job based on the print request by converting the file into a bitmap (BMP) image or a portable document format (PDF) file and converting the BMP image or PDF file into a data format recognizable by the printer.

In some embodiment, in addition to the print microservice and the MQTT microservice, the cloud server may further include one or more of a file conversion service, a message service, a task scheduling service, and a file server. The file conversion service is configured to convert the file into the BMP image or the PDF file, and convert the BMP image or the PDF file into the data format recognizable by the printer.

By setting up a plurality of microservices, the architecture of the cloud server can be easily upgraded and changed.

Figure 4:
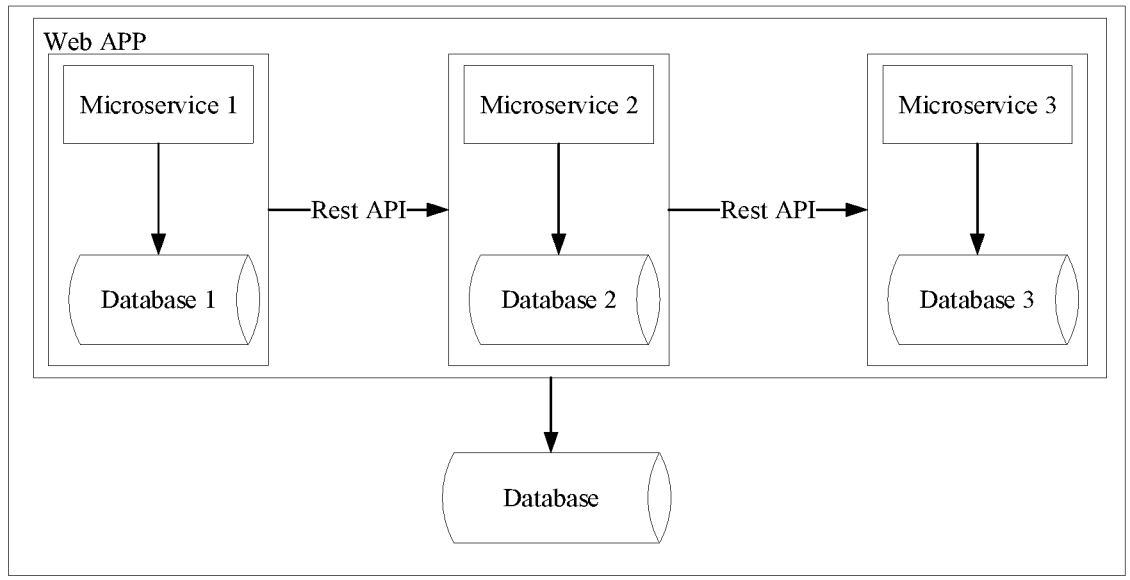
FIG. 4 is a schematic diagram of a microservice architecture to which the cloud printing method consistent with the embodiments of the disclosure is applicable.

FIG. 4 is a schematic diagram of a microservice architecture to which the cloud printing method consistent with the embodiments of the disclosure is applicable. As shown in FIG. 4, the cloud server includes a plurality of microservices, each of the plurality of microservices has a corresponding database, and each of the plurality of microservices is configured to handles a specific function. In some embodiments, the microservices include one or more of a print microservice, an MQTT microservice, a file conversion service, a message service, a task scheduling service, and a file server. Compared with the architecture of the existing cloud server, the cloud server consistent with the embodiments of the present disclosure includes a plurality of microservices to realize printing, which can print offline and facilitate subsequent deletion and addition of various microservices of the cloud server.

In some embodiments, the print microservice may be used to convert the file from the client terminal into a print format recognizable by the printer. The MQTT microservice may be used to manage information of the print request, receive and store the information of the print request from the client terminal and information of the print subscription request from the printer. The file conversion service is used to convert the file submitted by a user into the BMP file or the PDF file, and convert the BMP file or the PDF file into a PRiNter (PRN) file. The PRN file is in a data format recognizable by the printer. The message service may be used to manage message queues, receive messages, and send messages. The task scheduling service may be used for task management to manage a distribution of print tasks and scanning tasks, and a distribution of tasks among the plurality of servers. The file server may be used to store files uploaded by the user and parsed files.

Figure 5:
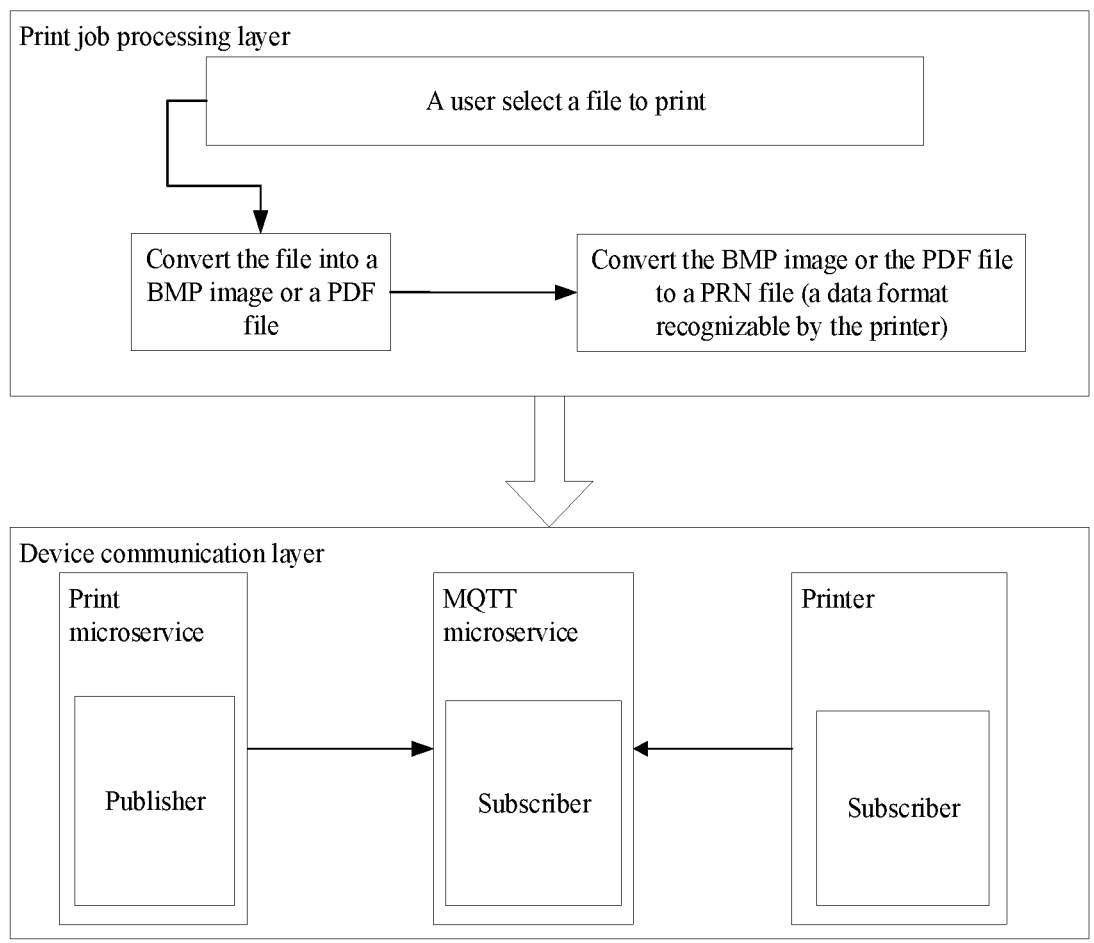
FIG. 5 is a schematic sequence diagram of a cloud server processing the cloud printing method consistent with the embodiments of the disclosure.

FIG. 5 is a schematic sequence diagram of a cloud server processing the cloud printing method consistent with the embodiments of the disclosure. As shown in FIG. 5, when cloud printing is executed, a print job processing layer (i.e., the file conversion service to process the file) of the cloud server may convert the print file selected by the user into a data format recognizable by the printer, and generate a print job. In a device communication layer between the server and a device (i.e., the printer), the print microservice may be used as a publisher to publish the print task with the print job as publication content to the MQTT microservice. The MQTT microservice may be used as a subscriber to receive the print task published by the print microservice. The printer may be used as another subscriber to send the print subscription request to the MQTT microservice and print the received print job from the cloud server.

By using the print microservice and the MQTT microservice consistent with the embodiments of the disclosure, the printer can perform both an online printing and an offline printing of the print task.

A cloud printing system consistent with the embodiments of the disclosure is provided. The cloud printing system may include a client terminal, a cloud server, and a printer. The cloud printing system may realize a fast-printing requirement of the user and an offline printing requirement of the user for printing files.

In some embodiments, in response to clicking at a file in an application program of the client terminal to execute printing, a print request may be sent to the cloud server from the client terminal. The cloud server may generate a print job and a URL of the print job according to the print request. The cloud server may start a print microservice and publish a print task to an MQTT microservice. After the printer is connected to the cloud server, the printer may send a print subscription request to the cloud server. The MQTT microservice may send the print task with the URL of the print job to the printer. The printer may download the print job from the cloud server according to the URL of the print job, and print the print job.

In some embodiments, the cloud server generates the print job based on the print request by converting the file into a BMP image or a PDF file and converting the BMP image or PDF file into a data format recognizable by the printer.

The print microservice and the MQTT microservice are used to process different services, respectively, to realize the image processing when the printer is offline. After the printer is online and is communicated connected with the cloud server, the printer sends the subscription request to the MQTT microservice as a subscriber, to obtain the print task, thereby realizing the offline printing required by the user.

In some embodiment, in addition to the print microservice and the MQTT microservice, the cloud server may further include one or more of a file conversion service, a message service, a task scheduling service, and a file server. The file conversion service is configured to convert the file into the BMP image or the PDF file, and convert the BMP image or the PDF file into the data format recognizable by the printer.

An electronic device consistent with the embodiments of the present disclosure is provided. The electronic device may include a memory storing a computer program, and a processor configured to execute the computer program to perform the cloud printing method consistent with the embodiments of the present disclosure.

A non-transitory computer-readable storage medium consistent with the embodiments of the present disclosure is provided. The non-transitory computer-readable storage medium stores computer instructions that, when executed by a processor, causing the processor to perform the cloud printing method consistent with the embodiments of the present disclosure.

The following embodiments describe an example application of the cloud printing method consistent with the embodiments of the disclosure using a smart phone.

Figure 6:
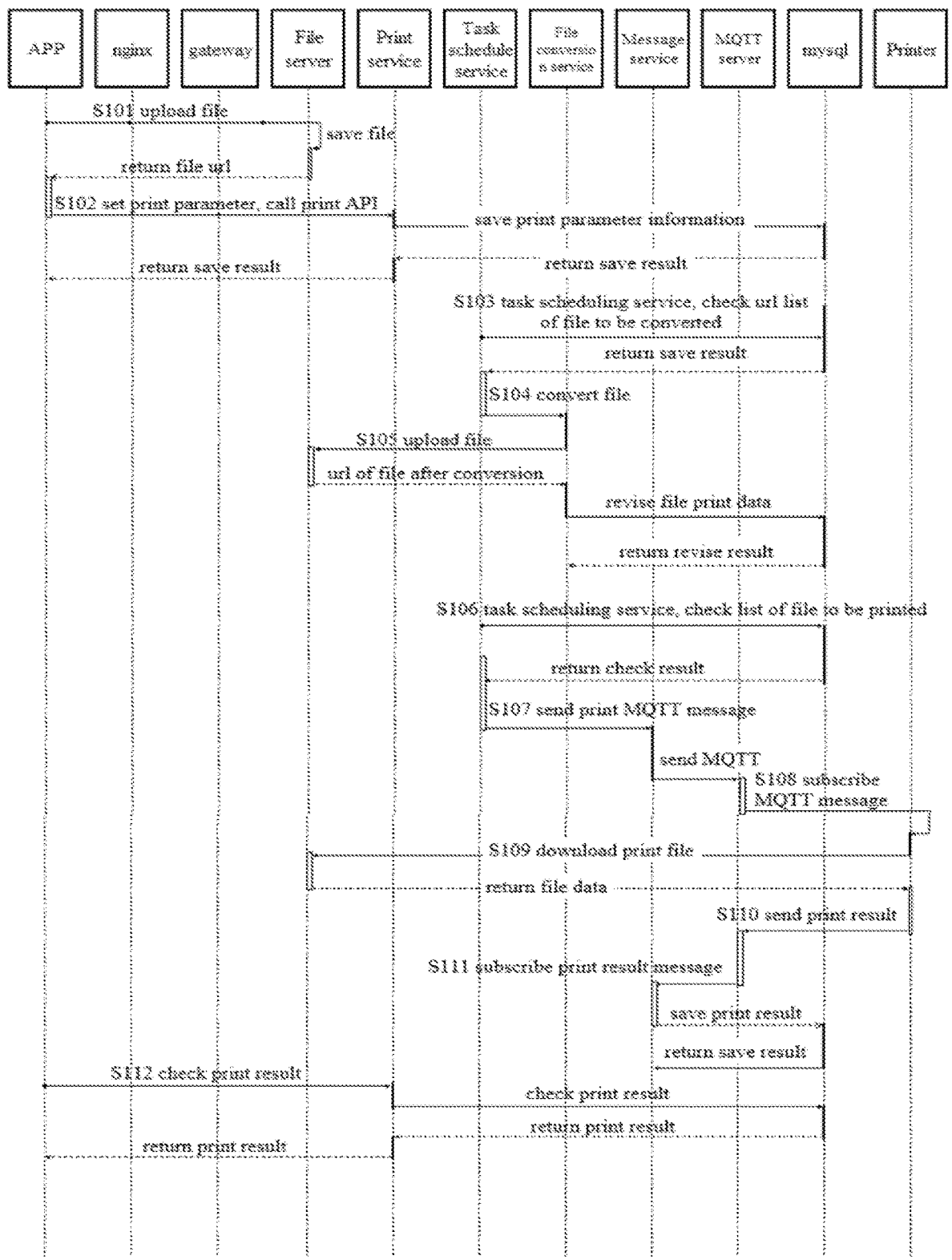
FIG. 6 is a schematic sequence diagram of an example application of the cloud printing method consistent with the embodiments of the disclosure.

FIG. 6 is a schematic sequence diagram of an example application of the cloud printing method consistent with the embodiments of the disclosure. As shown in FIG. 6, after an applet starts a printing for a file, where the applet is a program fragment running on an instant messaging application platform, at S101, the file is uploaded, that is, the applet sends the file to the cloud server. A gateway performs a content filtering on the file. Then the file is stored in a file server. A URL of the file is returned to the applet.

At S102, the applet sets printing parameters, calls a printing application programming interface (API), and transmits the printing parameters to mysql of a print microservice. Mysql stores printing records including, for example, printing time, printing file name, printing file size, printing status, printing file URL, and other information.

At S103, a task scheduling service queries a file URL list in mysql.

At S104, the task scheduling service sends the URL of the file to a file conversion service. The file conversion service performs conversion processing on the file including performing image processing on the file and converting the file into a data format recognizable by a printer.

At S105, the file conversion service stores the converted file in a file server, and obtains a URL of the converted file.

At S106, the task scheduling service queries a list of files to be printed in mysql.

At S107, the task scheduling service sends a printing MQTT service request to a message service. The message service sends an MQTT message to an MQTT server.

At S108, the printer subscribes the MQTT message from the MQTT server to obtain the URL of the file to be printed.

At S109, the printer downloads the file from the file server according to the URL and prints the file.

At S110, the printer sends a print result to the MQTT server.

At S111, the message service subscribes a print result message from the MQTT server and returns the print result message to mysql.

At S112, the applet queries the print microservice for the print result. The print microservice obtains the print result from mysql and returns the print result to the applet.

Figure 7:
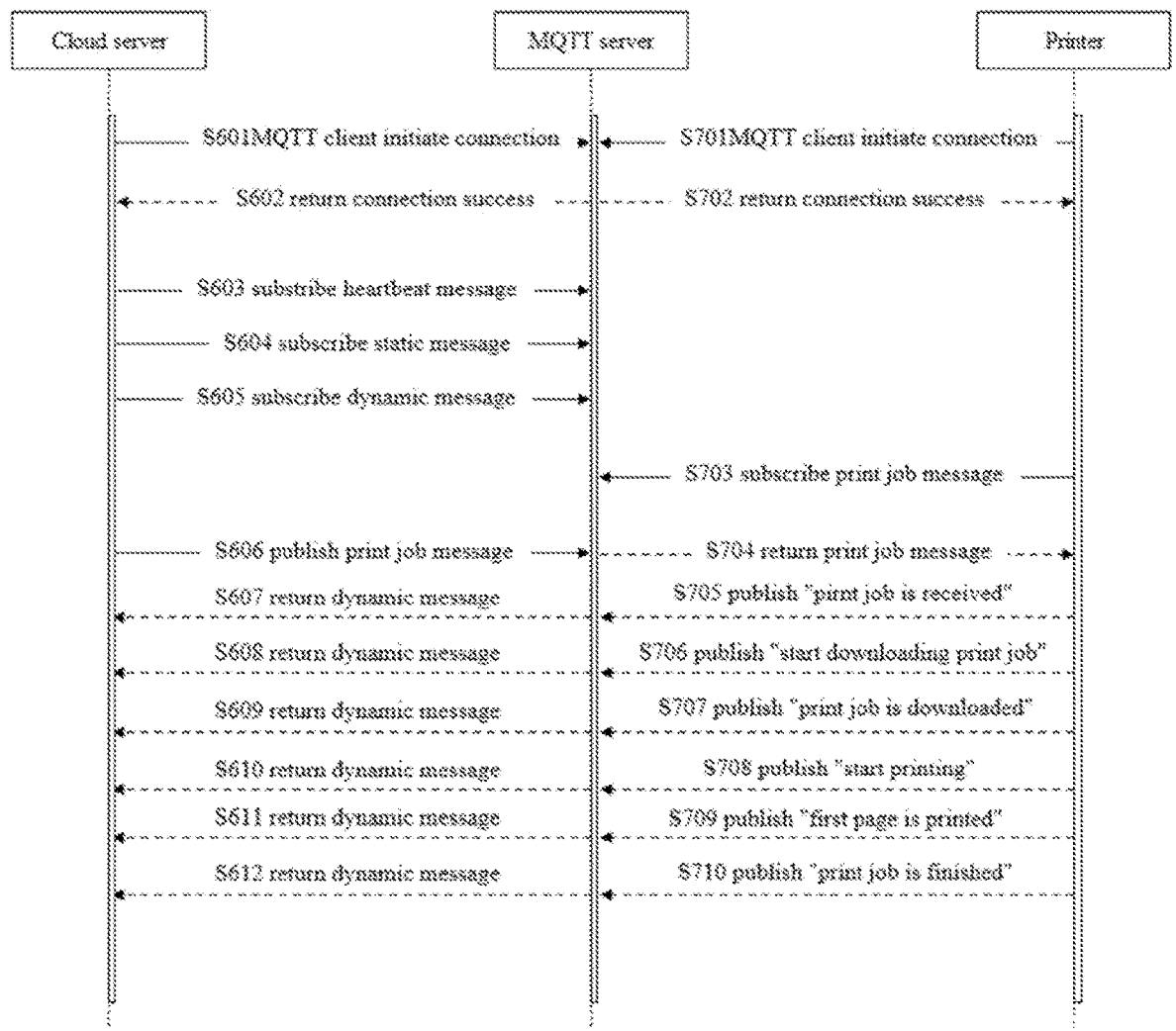
FIG. 7 is a schematic sequence diagram of implementing printing using an MQTT server consistent with the embodiments of the disclosure.

FIG. 7 is a schematic sequence diagram of implementing printing using an MQTT server consistent with the embodiments of the disclosure. As shown in FIG. 7, the printer subscribes a print job message from the MQTT server. The cloud server publishes the print job message to the MQTT server. The MQTT server returns the print job message to the printer subscribed to the print job message according to the print job message published by the cloud server.

The printer may send various dynamic messages to the MQTT server. The various dynamic messages may include that the print job is downloaded, printing is started, a first page is printed, and the print job is finished. The MQTT server returns the messages to the cloud server according to the various dynamic messages collected by the printer.

Figure 8:
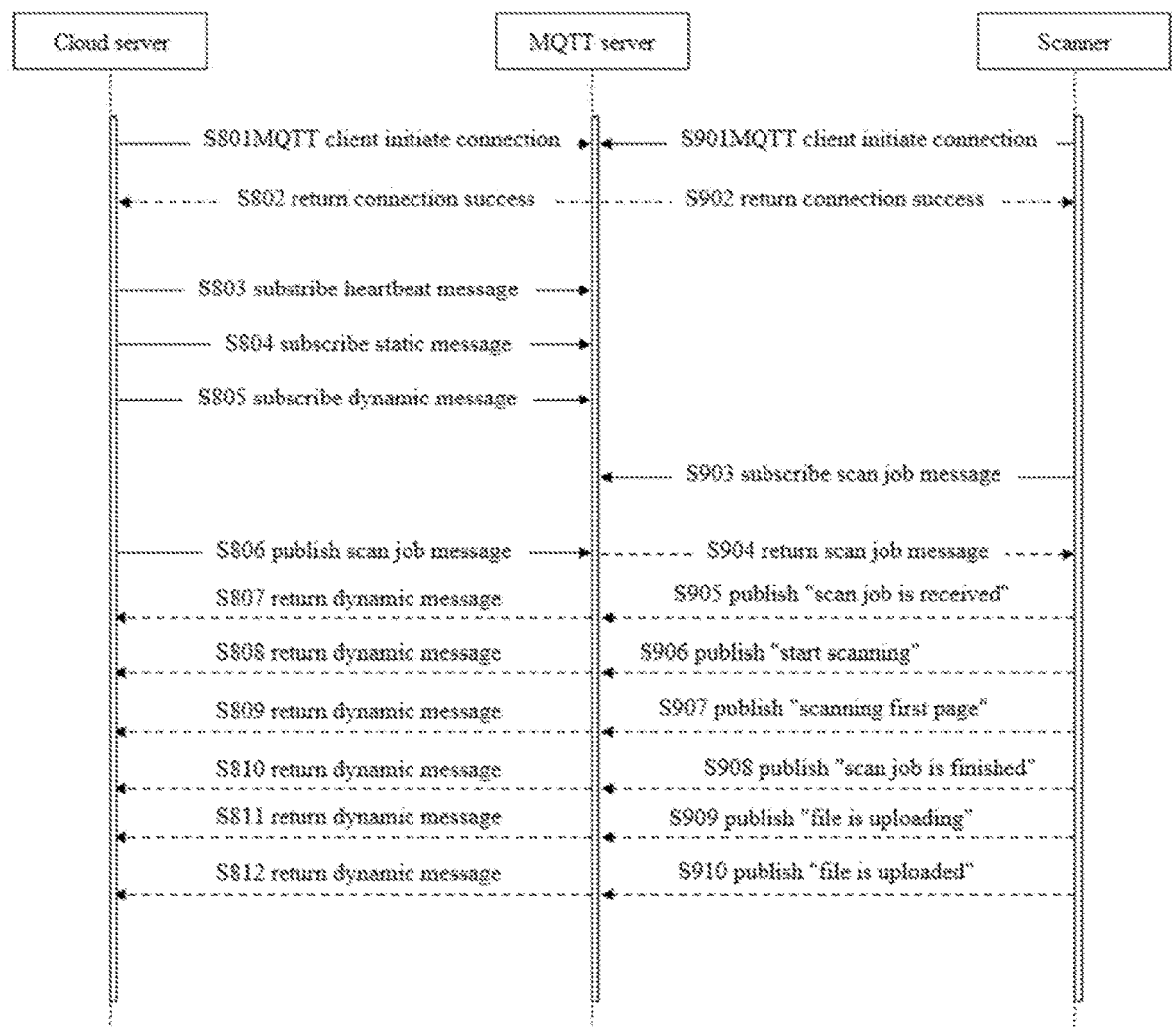
FIG. 8 is a schematic sequence diagram of implementing scanning using an MQTT server consistent with the embodiments of the disclosure.

FIG. 8 is a schematic sequence diagram of implementing scanning using an MQTT server consistent with the embodiments of the disclosure. As shown in FIG. 8, a scanning device or a multi-function printing device may subscribe a scan job message from the MQTT server. The cloud server publishes the scan job message to the MQTT server. The MQTT server returns the message to the scanning device or the multi-function printing device according to the scan job message published by the cloud server.

The scanning device or the multi-function printing device may send various dynamic messages to the MQTT server, including that the scan job is received, scanning is started, a first page is scanned, the scan job is completed, a file is uploading, and the file uploading is completed. The MQTT server returns the message to the cloud server based on the collected various dynamic messages.

Based on the embodiments of the present disclosure, it is convenient for the user to print files offline in the instant messaging application platform. The cloud server of a printer manufacturer can implement upgrading and development of different microservices.

The offline or online management and control of cloud printing is realized through the MQTT server consistent with the embodiments of the present disclosure.

Based on the embodiments of the present disclosure, device long-connection monitoring, device status monitoring, device registration monitoring, device binding monitoring, and device unbinding monitoring can be realized, to achieve real-time device monitoring and reliability of network transmission service in low-bandwidth and unstable network environments, which is applicable for various complex networks and is beneficial to provide third-party platform development.

The following technical effects can be achieved through the embodiments of the present disclosure. (1) Using the MQTT microservice to publish the print task can realize offline printing. When the offline printer reconnects to the cloud server, the offline printer can receive the print task from the MQTT microservice. (2) The cloud server platform adopts microservice architecture to realize separation of various business modules. Each microservice adopts a lightweight communication mechanism. Each microservice is an independent business module, which can be developed in different languages and use different data storage technologies. The technology stack is not limited and can be expanded on demand.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. A cloud printing method comprising:
in response to a click on a file in an application program of a client terminal to execute printing, receiving, by a cloud server, a print request sent by the client terminal;
generating, by the cloud server, a print job and a uniform resource locator (URL) of the print job based on the print request; and
starting, by the cloud server, a print microservice and publishing a print task to a message queuing telemetry transport (MQTT) microservice according to the print job;
wherein:
after a printer is connected to the cloud server, the printer is configured to send a print subscription request to the cloud server;
the MQTT microservice is configured to send the print task with the URL of the print job to the printer; and
the printer is further configured to download the print job from the cloud server based on the URL of the print job and print the print job.

2. The method of claim 1, wherein generating, by the cloud server, the print job based on the print request includes:
converting the file into a bitmap (BMP) image or a portable document format (PDF) file; and
converting the BMP image or the PDF file into a data format recognizable by the printer.

3. The method of claim 1, wherein:
the cloud server includes the printing microservice, the MQTT microservice, and one or more of a file conversion service, a message service, a task scheduling service, and a file server; and
the file conversion service is configured to:
convert the file into a bitmap (BMP) image or a portable document format (PDF) file; and
convert the BMP image or PDF file into a data format recognizable by the printer.

4. The method of claim 1, wherein the cloud server includes the printing microservice and the MQTT microservice, each of the microservice having a corresponding database.

5. The method of claim 1, wherein the printer includes a single-function printer, a multi-function printer, or a digital composite machine.

6. The method of claim 1, wherein the client terminal includes a smart phone, a computer, a tablet, or a program installed on the smart phone, computer, or the tablet.

7. The method of claim 1, wherein the client terminal is communicated connected to the printer through the cloud server.

8. The method of claim 7, wherein the cloud server includes a DingTalk server, a QQ server, or a print manufacturer server.

9. A cloud printing system comprising:
a client terminal;
a cloud server; and
a printer;
wherein:
in response to a click on a file in an application program of the client terminal to execute printing, the client terminal is configured to send a print request to the cloud server;
the cloud server is configured to receive the print request and generate a print job and a uniform resource locator (URL) of the print job based on the print request;
the cloud server is further configured to start a print microservice and publish a print task to a message queuing telemetry transport (MQTT) microservice according to the print job;
after the printer is connected to the cloud server, the printer is configured to send a print subscription request to the cloud server;
the MQTT microservice is configured to send the print task with the URL of the print job to the printer; and
the printer is further configured to download the print job from the cloud server based on the URL of the print job and print the print job.

10. The cloud printing system of claim 9, wherein the cloud server is further configured to:
convert the file into a bitmap (BMP) image or a portable document format (PDF) file; and
convert the BMP image or the PDF file into a data format recognizable by the printer.

11. The cloud printing system of claim 9, wherein:
the cloud server includes the printing microservice, the MQTT microservice, and one or more of a file conversion service, a message service, a task scheduling service, and a file server; and
the file conversion service is configured to:
convert the file into a bitmap (BMP) image or a portable document format (PDF) file; and
convert the BMP image or PDF file into a data format recognizable by the printer.

12. The cloud printing system of claim 9, wherein the cloud server includes the printing microservice and the MQTT microservice, each of the microservice having a corresponding database.

13. The cloud printing system of claim 9, wherein the printer includes a single-function printer, a multi-function printer, or a digital composite machine.

14. The cloud printing system of claim 9, wherein the client terminal includes a smart phone, a computer, a tablet, or a program installed on the smart phone, computer, or the tablet.

15. The cloud printing system of claim 9, wherein the client terminal is communicated connected to the printer through the cloud server.

16. The method of claim 15, wherein the cloud server includes a DingTalk server, a QQ server, or a print manufacturer server.

17. A non-transitory computer-readable storage medium storing computer instructions that, when the computer instructions being executed, performing a method for cloud printing method, the method comprising:
in response to a click on a file in an application program of a client terminal to execute printing, receiving, by a cloud server, a print request sent by the client terminal;
generating, by the cloud server, a print job and a uniform resource locator (URL) of the print job based on the print request; and
starting, by the cloud server, a print microservice and publishing a print task to a message queuing telemetry transport (MQTT) microservice according to the print job;
wherein:
after a printer is connected to the cloud server, the printer is configured to send a print subscription request to the cloud server;
the MQTT microservice is configured to send the print task with the URL of the print job to the printer; and
the printer is further configured to download the print job from the cloud server based on the URL of the print job and print the print job.

18. The storage medium of claim 17, wherein generating, by the cloud server, the print job based on the print request includes:
converting the file into a bitmap (BMP) image or a portable document format (PDF) file; and
converting the BMP image or the PDF file into a data format recognizable by the printer.

19. The storage medium of claim 17, wherein:
the cloud server includes the printing microservice, the MQTT microservice, and one or more of a file conversion service, a message service, a task scheduling service, and a file server; and
the file conversion service configured to:
convert the file into a bitmap (BMP) image or a portable document format (PDF) file; and
convert the BMP image or PDF file into a data format recognizable by the printer.

20. The storage medium of claim 17, wherein the cloud server includes the printing microservice and the MQTT microservice, each of the microservice having a corresponding database.

* * * * *